Aug. 2, 1960 V. W. BOLIE 2,947,934

LOGARITHMIC FUNCTION GENERATOR

Filed Aug. 22, 1955

INVENTOR.
VICTOR W. BOLIE
BY
Mordy & Hatcher
ATTORNEYS

United States Patent Office 2,947,934
Patented Aug. 2, 1960

2,947,934

LOGARITHMIC FUNCTION GENERATOR

Victor W. Bolie, Cedar Rapids, Iowa, assignor to Collins Radio Company, Cedar Rapids, Iowa, a corporation of Iowa Filed Aug. 22, 1955, Ser. No. 529,731
7 Claims. (Cl. 323—74)

This invention relates to variable impedance devices. More specifically, the invention relates to two-terminal networks the impedance of which may be varied according to some mathematical law.

In some electronic engineering work there will arise a problem of devising a function generator. In computers and servo systems, for example, a device is needed to translate a position or some other quantity into an electrical intelligence and in some instances have a non-linear function output relative to the input to the function generator. The function generator usually consists of some type of electrical analogue. For example, the function $f(t)=kt$ can be synthesized in an approximate form by use of an integrating circuit having a constant voltage input. Similarly, a function which is to be the quotient of two other functions, can be synthesized by use of servo driven potentiometers. Repetitive arbitrary time functions can also be generated by causing the beam of a cathode-ray tube to follow a function graph which is placed on the tube face.

Potentiometer networks and non-linear potentiometers also may be used for this purpose, and have been widely used in computer circuits in recent years. Non-linear potentiometers which generate sine and cosine functions are commercially available. Several circuits incorporating linear potentiometers to generate functions approximating the sine function have been patented. A recent article by Harold Levenstein, "Generating Non-Linear Functions With Linear Potentiometers," Tele-Tech, October 1953, describes some general "cut-and-try" rules for using linear potentiometers to approximate certain non-linear functions. None of the prior art, however, will show how to devise certain function generators using linear potentiometers with any desired degree of accuracy in the generated function.

Accordingly, it is an object of this invention to provide a two-terminal network the terminal impedance of which will vary as a mathematical function with relation to a mechanical input.

It is a further object of this invention to synthesize a function generator with high accuracy from linear potentiometers.

One of the features of this invention is that a function expressible according to the theory of continued fractions can be used as the rule for synthesis of that non-linear function by use of linear potentiometers. Another feature of this technique is that the accuracy of the generated function can be improved without limit, other than the linearity of the potentiometers used, by expanding the network in a prescribed, regular manner.

As long as a function can be represented as a suitable continued fraction, the correlative impedance or function generator may be synthesized using linear passive elements.

Further objects, features, and advantages of the invention will become apparent from the following description and claims when read in view of the drawings, in which:

Figure 1:
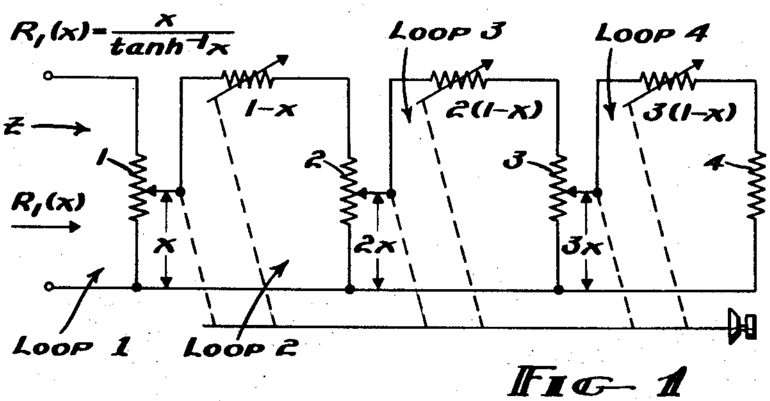
Figure 1 shows a ladder-type network synthesizing the function of the argument divided by the hyperbolic tangent of said function.

The theory of continued fractions has been investigated by mathematicians for an extended period. An article by Thomas Muir, "New General Formula for the Transformation of Infinite Series Into Continued Fractions," Royal Society of Edinburgh, Transactions, volume 27, 1872–1876, page 467, describes how the ratio of two Taylor's Series expansions $$\frac{1+A_1x+A_2x^2+A_3x^3+\ldots}{1+B_1x+B_2x^2+B_3x^3+\ldots} \qquad (1)$$

can be expressed as a continued fraction which has the form $$1+\cfrac{x}{a_1+\cfrac{x}{a_2+\cfrac{x}{a_3\ldots}}} \qquad (2)$$

wherein the coefficients $a_i$ of the continued fraction are definable in terms of the coefficients $A_j$ and $B_k$ of Equation 1 and are available in the article by Muir. It is to be noted that the continued fraction (Equation 2) is derived by actually dividing the numerator of Equation 1 by the denominator thereof.

The continued fraction representation of poorly-convergent power series has been found to be valuable in digital computer techniques. The power series $$\arctan x=x-\frac{x^3}{3}+\frac{x^5}{5}\ \ldots \qquad (3)$$

representing the arctangent function converges slowly and requires a large number of terms for accurate evaluation. The corresponding continued fraction representation $$\arctan x=\cfrac{x}{1+\cfrac{x^2}{3+\cfrac{(2x)^2}{5+\cfrac{(3x)^2}{7+\ldots}}}} \qquad (4)$$

converges rapidly and requires relatively few terms for accurate evaluation. The following table is illustrative of the relative conversion rates of the power series expansion of Equation 3 and the continued fraction representation of Equation 4 of arctangent function.

TABLE I

*Number of terms required to compute arctan x to 6 decimals*

| $x$ | Power Series | Continued Fraction |
|---|---|---|
| .1 | 3 | 3 |
| .2 | 4 | 3 |
| .3 | 5 | 4 |
| .4 | 6 | 5 |
| .5 | 8 | 5 |
| .6 | 11 | 7 |
| .7 | 15 | 7 |
| .8 | 22 | 7 |
| .9 | 44 | 8 |
| 1.0 | ---------- | 8 |
| 2.0 | ---------- | 15 |

Other examples of readily available continued fraction representations of functions are:

$$\tan x=\cfrac{x}{1-\cfrac{x^2}{3-\cfrac{x^2}{5-\cfrac{x^2}{7-\cdots}}}} \qquad (5)$$

$$\ln (1+x)=\cfrac{x}{1+\cfrac{1x^2}{2+\cfrac{1x^2}{3+\cfrac{2x^2}{4+\cfrac{2x^2}{5+\cdots}}}}} \qquad (6)$$

It is to be noted that there are several different forms of expressing the continued fraction expansion of the function. Equation 6 might be as validly expressed as $$\ln (1+x)=\cfrac{1}{\cfrac{1}{x}+\cfrac{1}{\cfrac{2}{1^2}+\cfrac{1}{\cfrac{3}{x}+\cfrac{1}{\cfrac{4}{2^2}+\cdots}}}} \qquad (7)$$

In an analysis of ladder networks, of which Figure 1 is an example, by common in the art technique (e.g. setting up a series of simultaneous equations by loop current techniques and then solving by determinants), solution of the equation for impedance of the network, Z, looking into the two terminals may be found to be $$Z=Z_{11}-\cfrac{Z_{12}^2}{Z_{22}-\cfrac{Z_{23}^2}{Z_{33}-\cfrac{Z_{34}^2}{Z_{44}}}} \qquad (8)$$

where loop 1, loop 2, loop 3, and loop 4 are as labelled in Figure 1, and the loop and mutual impedances are identified by the sub-scripts of the impedances, as is commonly done in analyses of this type. More specifically, for example, the loop or self impedance of the second loop is $x+(1-x)+2$ and the mutual or common impedance of the second and third loops is $2x$. The reason for the particular arrangement of the various resistors making up the self impedance of the various loops and the use of the variable term $x$ will be understood more fully later herein when the various resistors of the network are made to represent the terms of a function-representing continued fraction. From Equation 8 it can be seen that the impedance of a ladder network can be written in the form of a finite continued fraction. The successive numerators of the continued fraction are the squares of the mutual impedances in the network. The leading terms in the successive denominators of the continued fraction are self-impedances of the network.

The input impedance to a ladder network can also be written as a finite continued fraction of another type in which the numerator and denominator entries are the series and shunt impedances of the network. This ladder network, together with its input impedance, may have the notation of the odd numbered sub-script impedances as the series impedances and the even numbered sub-script impedances as the shunt impedances. Such notation is used by Otto Brune in "Synthesis of a Finite Two-Terminal Network Whose Driving-Point Impedance Is a Prescribed Function of Frequency." Journal of Mathematics and Physics, volume 9–10, 1930, page 191–236.

Figure 2:
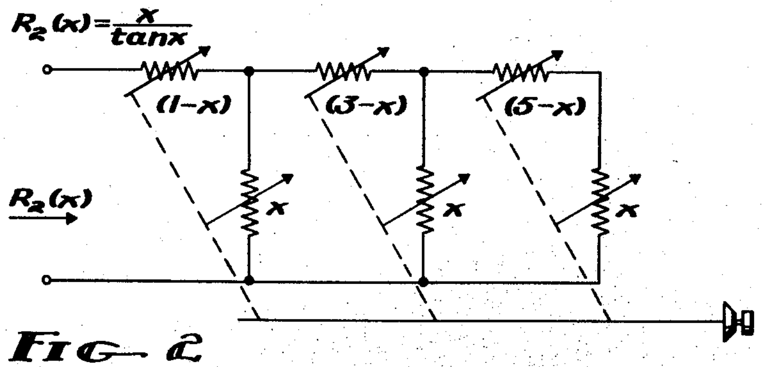
Figure 2 shows a network which will generate the function of the argument divided by the tangent of said function.

The input impedance to said ladder-type network or of a type such as seen in Figure 2, using the above impedance notations, may be seen to be $$Z=Z_1+\cfrac{1}{\cfrac{1}{Z_2}+\cfrac{1}{Z_3+\cfrac{1}{\cfrac{1}{Z_4}+\cfrac{1}{Z_5+\cfrac{1}{\cfrac{1}{Z_6}}}}}} \qquad (9)$$

Here again as in the case of Fig. 1 the corresponding impedances of the structure of Fig. 2 are not designated $Z_1$, $Z_2$, $Z_3$, $Z_4$, etc. Rather such corresponding impedances are designated $1-x$, $x$, $3-x$, $x$, etc. in anticipation of representing the terms of a specific function-representing continued fraction to be discussed later herein.

From the continued fraction theory, outlined above, and the expansions of input impedances to ladder networks, there can be synthesized certain non-linear functions by means of linear potentiometer networks. For example, the function $$R(x)=\frac{x}{\tan h^{-1}x} \qquad (10)$$

has the following continued fraction expansion $$R(x)=1-\cfrac{x^2}{3-\cfrac{(2x)^2}{5-\cfrac{(3x)^2}{7-\cdots}}} \qquad (11)$$

Comparison of the continued fraction of Equation 11 with the corresponding expansion for the input impedance to a resistive ladder network (Equation 8, for example) shows that the function $R(x)$ can be represented by the input resistance to the infinite ladder network, three repeating sections of which are shown in Figure 1. In this network the mutual impedances between successive loops are those indicated by the successive numerators in the continued fraction representation (Equation 11). More specifically $Z_{12}$, $Z_{23}$, and $Z_{34}$ respectively equal $x$, $2x$, and $3x$. The common impedance may be defined generally by $nx$ where $n$ is equal to the sequential order of the first loop of the two adjacent loops containing the common impedance. For example, $n=3$ if loops 3 and 4 contain the common impedance being determined. Likewise, the self-impedance of the various current loops in the network are defined by the leading coefficients in the successive denominators of the continued fraction. More particularly $Z_{11}$, $Z_{22}$, $Z_{33}$, and $Z_{44}$ respectively equal 1, 3, 5, and 7. As a specific example of determination of the self impedance, consider loop 2 of Fig. 1 where $x+(1-x)+2=3$. The resistor having the value $1-x$ is necessary in order to maintain a constant value of 3 as $x$ varies. The self impedance Z may be defined generally as $(2n-1)$ where $n$ is equal to the sequential order of the loop containing the self impedance being determined.

The infinite ladder network may be approximated to any degree of accuracy by a finite number of sections. Such a terminated network may be called the $n$th convergent network. The $n$th convergent network is a network which is representative of an infinite continued fraction in which terms beyond the $n$th partial denominator are discarded, to result in a $n$th convergent continued fraction. For example, the third convergent of the continued fraction expansion of the function $R(x)$ may be represented as $$R_3(x)=1-\cfrac{x^2}{3-\cfrac{(2x)^2}{5}} \qquad (12)$$

The higher-order convergents are similar in form to Equation 12.

The third convergent $R_3(x)$, expressed in Equation 12, of the continued fraction $R(x)$ is synthesized by the network of ganged linear potentiometers seen in Figure 1, involving loop 1, loop 2, and loop 3, terminated by the fixed resistance 3 in loop 3. The motion of the linear potentiometer gives equal resistance increments from the tap to an end for an increment of rotation. The "concurrent" rotational input to the ganged linear potentiometers is shown made by an input knob as exemplary of manual or servo-positioned mechanical inputs. Clearly a more accurate representation of $R(x)$ may be achieved by using more loops. Each successive convergent is more accurate than the previous, until the accuracy of the approximation of $R(x)$ represented by the input impedance of a network may be limited by other factors such as the linearity available in potentiometer, or with other physical infirmities of the circuit. Figure 1 shows the circuit for fourth convergent of the function $R(x)$. In Figure 1 the correct impedances to be inserted in each loop may be easily determined from the regularity of the succeeding cofficients in the infinite continued fraction.

Another example of a function which can be synthesized by this technique is the function $$\frac{x}{\tan x}$$

The function $$\frac{x}{\tan x}$$

can be expressed as a continued fraction:

$$\frac{x}{\tan x}=1-\cfrac{x^2}{3-\cfrac{x^2}{5-\cfrac{x^2}{7-\ldots}}} \qquad (13)$$

As before, the function can be synthesized to any degree of accuracy by including enough loops of the infinite ladder network. Figure 2 shows the first three loops of such a ladder network and, as it is drawn, represents the third convergent thereof.

Figure 3:
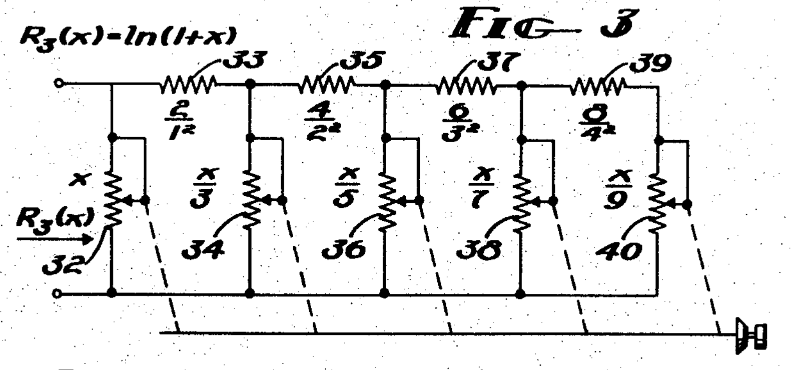
Figure 3 shows a circuit which will generate the natural logarithm of one plus the variable.

As discussed hereinbefore the function $1n(1+x)$ can be expressed by a continued fraction (see Expression 7). A similarity of Expression 7 and the continued fraction of Expression 9 is apparent upon inspection. By equating the terms of Expression 9 to the corresponding terms of Expression 7 the individual impedances of the ladder type network can be determined in terms of the terms in Expression 7. The resultant ladder type network is shown in Fig. 3.

Figure 4:
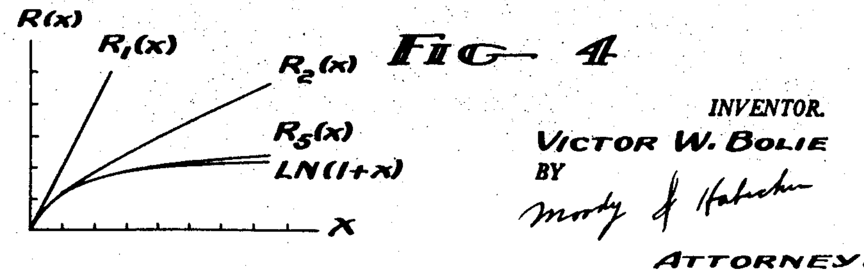
Figure 4 shows the accuracy of the invention of Figure 3 in approximating the function simulated.

As an example of the accuracy of various orders of convergents, i.e., the number of terms used, Fig. 4 shows the first, second, and fifth convergents of $f(x)=1n(1+x)$ in comparison with the summation of the terms $1n(1+x)$. It is obvious from the curves of Fig. 4 that the fifth conversion (i.e., when the first five terms are employed) closely approximates the function, and that the circuit of Fig. 3 embodying the fifth convergent would therefore have high accuracy as a generator of the function of $1n(1+x)$.

Scale factors can be employed to increase the order of magnitude of the input impedance of the synthesized network. For example, $f(x)=10^4\times 1n(1+x)$ has the following continued fraction representation.

$$f(x)=\cfrac{1}{\cfrac{1}{10^4x}+\cfrac{1}{\cfrac{2}{1^2}\cdot 10^4+\cfrac{1}{\cfrac{3}{10^4x}+\cfrac{1}{\cfrac{4}{2^2}\cdot 10^4+\ldots}}}} \qquad (14)$$

In illustration of the application of the invention to practice, but without limiting myself to these specific values, the following values are given, using Figure 3 as the function generator having the equation:

$$R(x)=10{,}000\ 1n(1+x)\ \text{ohms} \qquad (15)$$

where $x$ equals 315,000 $\theta$ and $\theta$ is fractional shaft rotation.

32=315K linear potentiometer
34=105K linear potentiometer
36=63K linear potentiometer
38=47K linear potentiometer
40=35K linear potentiometer
33=20K fixed
35=10K fixed
37=6.666K fixed
39=5.0K fixed Although this invention has been described with respect to particular embodiments thereof, it is not to be so limited because changes and modifications may be made therein which are within the full intended scope of the invention, as defined by the appended claims.

I claim:

1. A ladder network having an impedance variable as a non-linear electrical function of a linear mechanical change, and comprising repeating loops of impedances, each loop comprising at least three impedances, at least two of the corresponding impedances in each loop being variable, and mechanical coupling means constructed to vary concurrently said variable impedances.

2. A ladder network in accordance with claim 1 wherein one of the variable impedances in each of said repeating loops comprises a variable portion of a fixed impedance of a preceding loop, and a fixed impedance.

3. A ladder network in accordance with claim 1 wherein each of said loops comprises the series arrangement of a first of said corresponding variable impedances and a fixed impedance shunting the second of said variable impedances of the prior loop.

4. A two-terminal ladder network having an input impedance which varies as the function $$\frac{x}{\tanh^{-1}x}$$

where $x$ represents a variable input signal, said two-terminal network comprising a first impedance with a variable tap, a first loop comprising a variable impedance in series with another impedance having a variable tap, said loop connected between the variable tap of said first impedance and one end terminal of said first impedance, at least one additional loop similar to said first loop connected in cascade manner with each loop connected across the variable tap and the corresponding one end terminal of the impedance having a variable tap of the immediately preceding loop, and means for changing each of said variable taps and said variable impedances concurrently.

5. A ladder type network constructed to produce predetermined nonlinear output signals in response to linear manual control means, said ladder type network comprising a plurality of electrical loops arranged in cascade, each of said loops having three impedances including a self impedance, an impedance common with the immediately preceding electrical loop and an impedance common with the immediately following electrical loop, at least two of said impedances of each loop being variable, said ladder type network having an input impedance which is expressable by a first continued fraction with the said self impedances and the common impedances of said loops forming the terms of said first continued fraction, said self impedances and said common impedances constructed to have values equal to the values of corresponding terms of another continued fraction which is similar in form to said first continued fraction and in which some of said corresponding terms are variable, said other continued fraction being representative of a certain desired mathematical function, and means for varying linearly the impedances of said self impedances and said common impedances which correspond to the corresponding variable terms in said similar continued fraction.

6. A ladder type network in accordance with claim 5 and expressable by the continued fraction:

$$Z=Z_{11}-\cfrac{Z_{12}^2}{Z_{22}-\cfrac{Z_{23}^2}{Z_{33}-\cfrac{Z_{34}^2}{Z_{44}-\cdots}}}$$

where $Z_{11}, Z_{22}, Z_{33} \ldots Z_{nn}$ represent the self impedances of succeeding electrical loops, and where $Z_{12}, Z_{23}, Z_{34} \ldots Z_{n(n+1)}$ represent the common impedances of successive pairs of adjacent electrical loops, in which said desired mathematical function is $$\frac{x}{\tan h^{-1}x}$$

expressable by the continued fraction:

$$1-\cfrac{X^2}{3-\cfrac{(2X)^2}{5-\cfrac{(3X)^2}{7-\cdots}}}$$

in which the self impedances of successive ones of said electrical loops are equal to $(2n-1)(1-x)$, where $n$ is the sequential order of the loop in which the self impedance appears, and in which the common impedances of successive pairs of adjacent loops are equal to $nx$ where $n$ is the sequential order of the first appearing electrical loop of any two adjacent electrical loops comprising the common impedance being determined.

7. A ladder type network in accordance with claim 5 and expressable by the continued fraction:

$$Z=Z_1+\cfrac{1}{\cfrac{1}{Z_2}+\cfrac{1}{Z_3+\cfrac{1}{\cfrac{1}{Z_4}+\cfrac{1}{Z_5+\cdots}}}}$$

where $Z_2, Z_4 \ldots Z_{2n}$ represent the common impedances of successive pairs of adjacent electrical loops, where $Z_1, Z_3, Z_5 \ldots Z_{n-1}$ represent series portions of successive self impedances which are not common to another electrical loop, and in which the desired mathematical function is $1n(1+X)$ which is expressable by the continued fraction:

$$\cfrac{1}{\cfrac{1}{X}+\cfrac{1}{\cfrac{2}{1^2}+\cfrac{1}{\cfrac{3}{X}+\cfrac{1}{\cfrac{4}{2^2}+\cfrac{1}{\cfrac{5}{X}+\cdots}}}}}$$

and in which said series portions of successive portions of self impedances of said electrical loops are equal to $$\frac{2(n-1)}{(n-1)^2}$$

where $n$ is the sequential order of the electrical loops in which the said series portions are included, in which said common impedances of successive pairs of adjacent electrical loops are equal to $$\frac{X}{2n-1}$$

where $n$ is the sequential order of the first appearing loop of the pair of successive, adjacent electrical loops comprising the common impedance being determined.

References Cited in the file of this patent

UNITED STATES PATENTS

| | | |
|---|---|---|
| 1,858,364 | Koenig | May 17, 1932 |
| 2,423,463 | Moore | July 8, 1947 |
| 2,737,343 | Hinton | Mar. 6, 1956 |

OTHER REFERENCES

Publication: "Generating Nonlinear Functions With Linear Potentiometers," by H. Levenstein, Tele-Tech and Electronic Industries, October 1953, pp. 76–78.

Publication: "Analog Methods in Computation and Simulation," by W. W. Soroka, McGraw-Hill Book Co., New York, 1954, page 54.